United States Patent [19]
Singh et al.

[11] Patent Number: 6,043,774
[45] Date of Patent: Mar. 28, 2000

[54] NEAR-RANGE PROXIMITY SENSOR HAVING A FAST-TRACKING ANALOG

[75] Inventors: Donald R. Singh, Apple Valley; William A. Witt, New Brighton, both of Minn.

[73] Assignee: Honeywell Inc., Minneapolis, Minn.

[21] Appl. No.: 09/047,642

[22] Filed: Mar. 25, 1998

[51] Int. Cl.[7] .............................. G01S 13/08; B61L 1/00
[52] U.S. Cl. ......................... 342/127; 342/129; 318/52; 246/169 R
[58] Field of Search ................................. 342/118, 127, 342/128, 129; 246/122 R, 169 R, 247; 318/561, 565, 52

[56] References Cited

U.S. PATENT DOCUMENTS

| | | | |
|---|---|---|---|
| 3,828,236 | 8/1974 | Close | 318/561 |
| 4,041,495 | 8/1977 | Martin | 342/465 |
| 4,186,331 | 1/1980 | DeBuhr et al. | 318/52 |
| 4,232,318 | 11/1980 | Becker et al. | 370/29 |
| 4,931,799 | 6/1990 | Wen et al. | 342/110 |
| 4,932,784 | 6/1990 | Danneskiold-Samsoe | 356/376 |
| 4,985,705 | 1/1991 | Stammler | 342/69 |
| 5,133,521 | 7/1992 | Gutauskas | 246/169 R |
| 5,359,331 | 10/1994 | Adler | 342/124 |
| 5,451,941 | 9/1995 | Lamazou et al. | 340/933 |
| 5,495,252 | 2/1996 | Adler | 342/127 |
| 5,610,819 | 3/1997 | Mann et al. | 364/426.05 |
| 5,746,399 | 5/1998 | Ehrlich et al. | 246/122 R |
| 5,803,411 | 9/1998 | Ackerman et al. | 246/169 R |
| 5,825,177 | 10/1998 | Finnestad et al. | 342/179 |

*Primary Examiner*—John B. Stotmayor
*Attorney, Agent, or Firm*—John G. Shudy, Jr.

[57] ABSTRACT

A proximity sensor having a generator providing a signal of which a small portion is used as a reference signal and the remaining portion is radiated out towards a target. The radiation reflected from the target is equalized and/or normalized relative to the reference signal. The signals are compared in terms of relative phase relationship. This relationship implies the distance of the target from an antenna. An example target may be a rail wheel. A certain part of the wheel is measured in terms of distance from the sensor. This distance may determine wheel wear. Such wear is gauged relative to a threshold signal or reference distance. Also, speed and direction of the rail wheel can be determined from the signal reflected back to the proximity sensor.

19 Claims, 10 Drawing Sheets

NEAR-RANGE PROXIMITY SENSOR HAVING A FAST-TRACKING ANALOG

BACKGROUND

This invention is directed generally to sensing nearby targets. More particularly, this invention involves the use of continuous wave (CW), radio frequency (RF) signals for measuring spatial properties or merely detecting the presence of suitably-positioned metallic or non-metallic targets, in a manner that is tolerant of harsh environments.

Conventional proximity sensing uses inductive switches to detect metal objects at different distances. An electromagnetic field generated by the sensor induces eddy currents on the surface of a metal target, which in turn modifies the sensor's oscillator voltage. This change indicates the presence of the target. These sensors are quite limited in that they can only sense conductive materials and the sensing distance is dependent on sensor size. Moreover, the sensor performance is susceptible to strong external magnetic fields.

Another category of sensors use light-based technology. A familiar application of light-based sensing is the laser speed detector used by police to determine the speed of a vehicle. These detectors measure how long it takes a pulse to travel from the sensor module to the target and back again to determine distance, and use two such measurements to calculate speed. Although sensors of this type can detect the presence and range of a target, they are not well suited for very short-range operation in harsh environments.

By utilizing electromagnetic energy, RF sensing offers greater versatility, particularly with regard to environmental tolerance. Microwave energy, for example, can easily penetrate dirt, oils, rain, fog, or snow. Microwave detection systems have been in use for a number of years, but they have substantial drawbacks. Others use pulse signals to measure time of flight, but this approach works poorly for short distances. Fast, accurate pulse measurements at close range require the use of extremely narrow pulses, which are particularly very difficult to generate, transmit, detect and correlate. Still others require digital circuitry, multiple antennas, modulation schemes, phase shifting circuitry or frequency division circuitry, which often adversely affects the cost, form factor, durability or versatility of the sensor. Such disadvantages have prevented RF sensing from being viable in numerous applications.

SUMMARY OF THE INVENTION

An RF source supplies a continuous wave RF signal to a measurement path and a reference path. The reference path remains within the sensor, and both paths terminate into a phase comparator (receiving inputs of the same frequency and generating an analog signal indicating their phase difference). The measurement path takes the signal through a circulator or other directional coupler into an antenna or other energy conversion means, which transmits the signal to an object or other external surface, which reflects part of it back toward the sensor. To maximize system performance, the design should minimize internal reflections from the antenna by conventional impedance matching. The antenna receives part of the externally reflected signal (having a diminished amplitude and a phase lag related to the distance to the external object) and sends it back into the coupler, which then diverts the signal through a limiting amplifier or other signal conditioner (filtering, amplifying, delaying, buffering, and/or demodulating the signal as necessary to preserve the meaningful components of a signal or reduce the unwanted components) into the phase comparator. The phase comparator produces an output related to the phase lag of the measurement signal relative to the reference signal.

This output thus varies according to the proximity of the object, and thus serves as the sensor output. It may be used either directly as a system output or in combination with other analog processing apparatus, as described below. For versatility in application, the signal is converted to an output voltage directly, without frequency division, switching, ramping or digitization.

This configuration provides fast-tracking, high performance sensing tolerant of harsh environments, dramatically improving sensing in rail wheel applications and other contexts, which can benefit from RF-frequency analog sensor output. It allows detection and ranging of nearby objects very quickly without the need for complex, expensive circuitry. It can achieve excellent range at very low power levels, facilitating battery longevity and minimizing environmental noise. Moreover, the invention can be implemented with readily available components as described below.

The detection and ranging technique of the present invention is based on the phase measurement of the reflected RF wave in the frequency domain. Since this technique depends on the phase and not magnitude of the reflected RF wave, the resulting signal will have a monotonic relationship with target range.

Rapid response to changes in target position can be crucial in many applications such as measuring train speed by sensing rail wheel position. The present invention accommodates this requirement by using only "fast-tracking" analog components within the sensor. That is, the phase comparator inputs see the same frequencies as the oscillator without needless delay circuitry, and hence that the sensor output seen at the phase comparator output reflects changes in target position with great speed. Slower-tracking systems require frequency down-conversion, sampling or other speed-compromising mechanisms. A fast-tracking sensor output preserves much more of the available phase offset information for use by post-processors.

The sensor output of the present invention, moreover, can be interpreted as described below without reference to phase shifting or other signal conditioning that occurs within the sensor. In other words, the sensor output is "integrated." Non-integrated and sensor-internal signals, by contrast, must be interpreted in conjunction with other sensor-internal signals or other real-time knowledge about such signal conditioning in order to extract the needed information.

In a single-frequency system incorporating an integrated sensor output signal, there is a one-to-one, nonlinear relationship between the distance to the target and the sensor output for suitable targets within the sensor's range. In other words, the sensor output depends on the target range monotonically. According to the present invention, this dependence may be used with or without precise knowledge of how sensor output varies with target range, as exemplified below.

DETAILED DESCRIPTION OF THE EMBODIMENTS

Figure 1A:
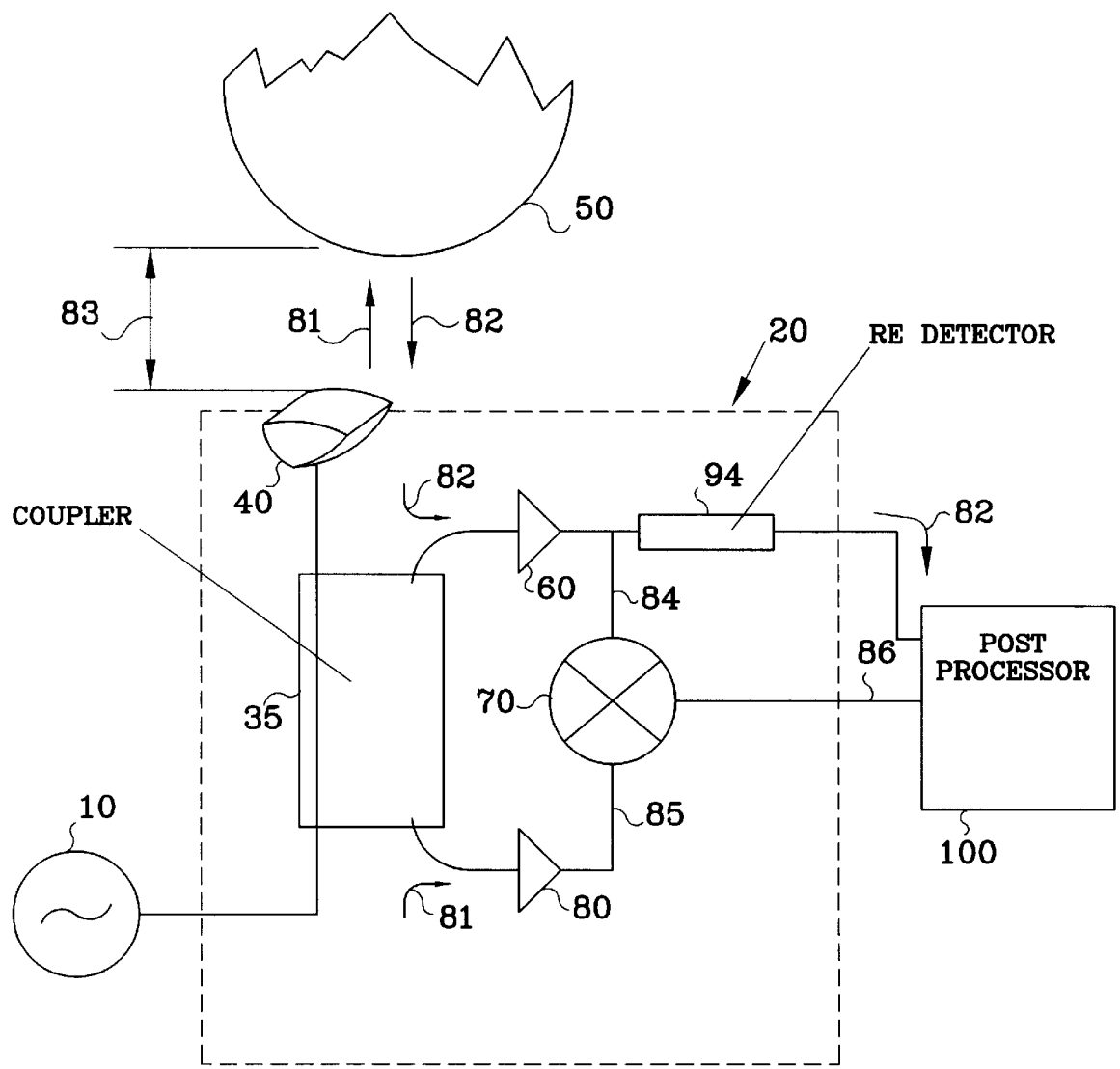
FIG. 1a is a schematic for an embodiment of the present invention.

FIG. 1a shows an RF proximity sensor 20 incorporated into an embodiment of the current invention. This embodiment is designed to operate in the 2–3 GHz range using off-the-shelf modular components. All the modular components of the sensor are interconnected using ordinary 50 ohm semi-rigid coaxial cables and, together with the sensor circuit board, mounted, for instance, inside a small aluminum box. A voltage controlled oscillator (VCO) 10 transmits an RF signal (~0 dBm) through a four-port coupler 35 to a planar antenna 40. Planar antenna 40 is constructed with a resonant patch on a dielectric substrate. Antenna 40 is mounted outside the box and is connected to coupler 35 by a 50 ohm semi-rigid coaxial cable.

Antenna 40 transmits a signal 81 outward. In the presence of a suitable target 50, antenna 40 receives an externally reflected echo signal 82, which is then routed toward a signal conditioner 60. Coupler 35 separates the transmitted energy 81 from reflected energy 82 along the measurement path, allowing the sensor to use one antenna 40 for signal flow in both directions. To assure that externally reflected signal 82 has a larger magnitude than that reflected back toward coupler 35 within sensor 20 itself, antenna 40 may be terminated in a conventional compensation circuit.

Coupler 35 also routes a portion of the energy from VCO 10 along the reference path toward signal conditioner 80. By including coupler 35 in the reference path, keeping the distance between coupler 35 and antenna 40 short, and employing matched elements in signal conditioners 60, 80; this embodiment substantially eliminates the offset between the measurement and reference paths. Matched filters in signal conditioners 60, 80 also help to exclude spurious noise received by antenna 40. Because VCO 10 in this embodiment operates at a fixed frequency of about 2.4 GHz, band pass filters tuned to that frequency may also be used.

As the measurement and reference signals enter phase comparator 70, they have the same wavelength '$\lambda_o$' and similar amplitudes ($P_{in}$ ~7 dBm, each). A common double-balanced mixer such as the SKY 5G (from Mini-Circuits, Inc., of New York) can serve as the phase comparator 70 for inputs with matched frequencies and similar amplitudes. Where a mixer 70 having insufficiently similar input amplitudes is used, signal conditioners 60, 80 must include amplitude equalization means. Measurement path signal conditioner 60 consists of three ERA-3SM amplifiers (from Mini-Circuits), and reference path signal conditioner 80 consists of two such amplifiers. A distance 83 from antenna 40 to target 50 is the target range 'R.' The measurement signal will lag the reference signal by a phase difference θ which approximately equals $2R(2\pi/\lambda_o)$ and thus R approximately equals $\theta/4\pi\lambda_o$. The approximate range of target 50 can thus be determined by measuring θ. Maximum range $R_{max}$, and the precision is set by a prudent selection of a VCO 10 frequency.

The measurement and reference signals are fed into the RF and local oscillator (LO) ports 84, 85, respectively, of phase comparator 70. Because the two signals have the same frequency, a DC output is obtained at IF port 86. The amplitudes of the (conditioned) inputs 84 and 85 are approximately equal in the presence of a suitable target 50, and the output voltage will vary in approximate proportion to cos(θ). Hence, $V_{out}$ is a measure of the induced phase θ and thereby the range 'R' of the target.

The above approximations will generally be most reliable for a large reflective target 50 having a uniform distance 83 from antenna 40 that is fairly close to $R_{max}$. For a conductive target 50 very near to antenna 40, some nonlinear effects may be observed due to electro magnetic coupling. Another type of distortion may occur when the nearest point of the detected surface of target 50 is small compared to a larger, farther portion of the detected surface of target 50. Distortions such as these, as well as environmental factors such as temperature and RF noise, are taken into account in deciding how the system uses sensor output 86 in post-processor circuitry 100.

Figure 1B:
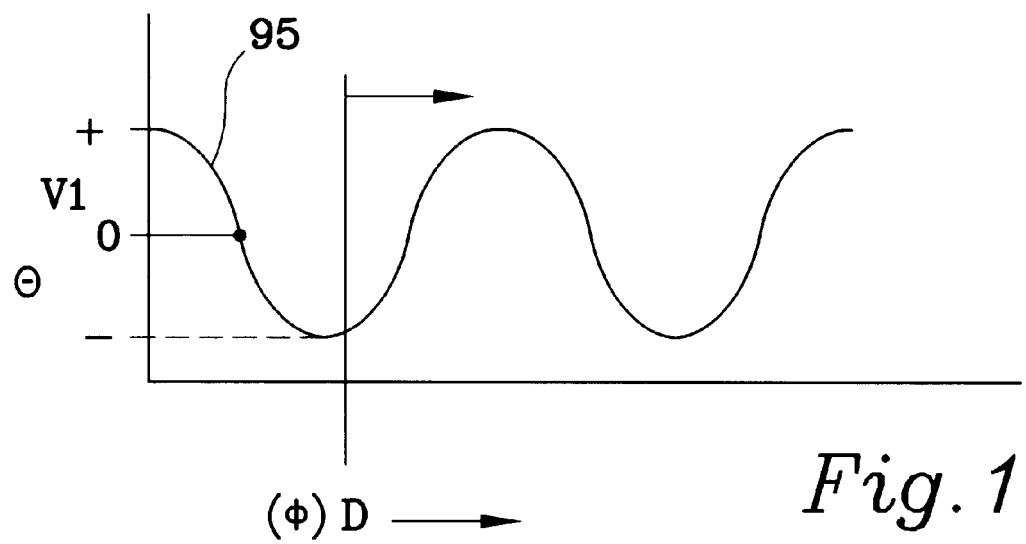
FIGS. 1b and 1c are graphs showing phase relationship and return signal strength, respectively.
Figure 1C:
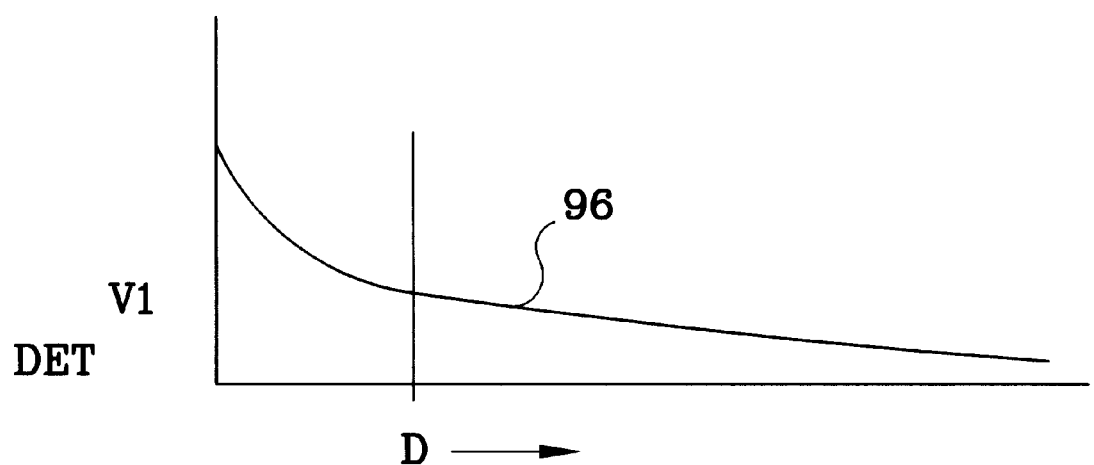

Sensor 20 of FIG. 1a shows an RF detector 94 connected to the output of conditioner or limiter 60. Detector 94 measures the strength of RF signal 82 from conditioner 60 as reflected from target 50. Curve 95 of FIG. 1b shows the voltage of signal 86 representative of the phase difference between reference signal 81 and reflected signal 82. This phase difference indicates distance 83 of the target 50 from antenna 40. However, voltage curve 95 repeats itself and thus there can be an ambiguous indication of distance 83. That ambiguity is resolved by detector 94 output which is depicted by curve 96 of FIG. 1c. Output curve 96 shows the decrease of the voltage of return signal 82 as distance 83 between antenna 40 and target 50 increases.

Figure 2A:
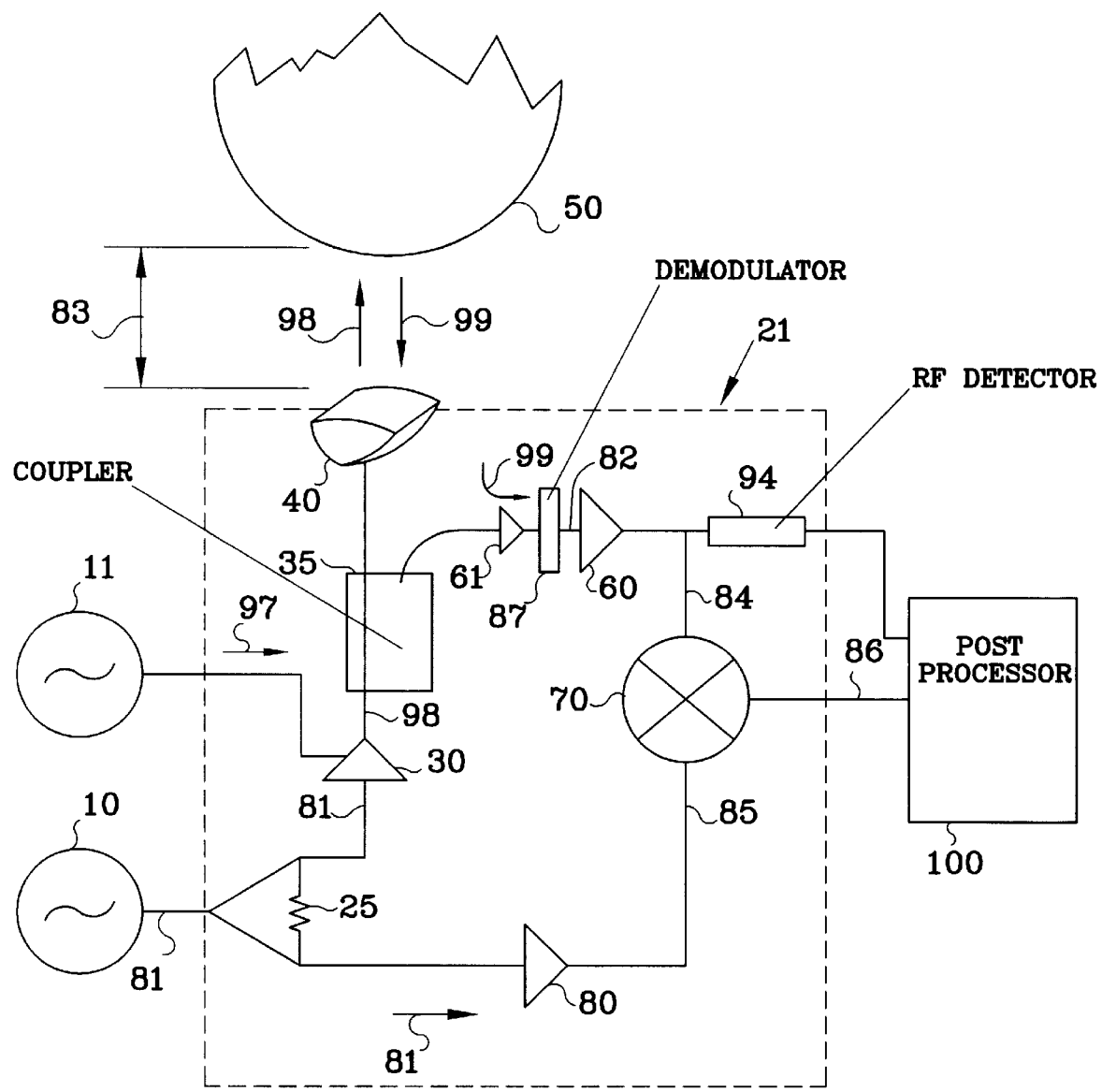
FIGS. 2a, 2b and 2c are other embodiments of the invention.

FIG. 2a shows a sensor 21 having a modulation scheme. Sensor 21 is like sensor 20 of FIG. 1a except for the modulation. An oscillator 10 provides an RF modulation signal 81 that has a frequency which is typically a fraction of the frequency of signal 97 from oscillator 11. Modulating signal 81 goes to signal conditioner 80 and also to modulator 30 which modulates carrier-like signal 97. Modulated signal 98 goes through coupler 35 and out of antenna 40 to target 50. Signal 99 is reflected and received by antenna 40 and goes through coupler 35 to conditioner, amplifier or limiter 61, if utilized, and to demodulator 87. Demodulator 87 recovers delayed modulation signal 82 from signal 98. Signal 82 goes to signal conditioner 60 and then to phase comparator 70 via input 84 to be compared with the signal from conditioner 80. Detector 94 functions like detector 94 of FIG. 1a. Detector 94 output goes to processor 100.

Figure 2B:
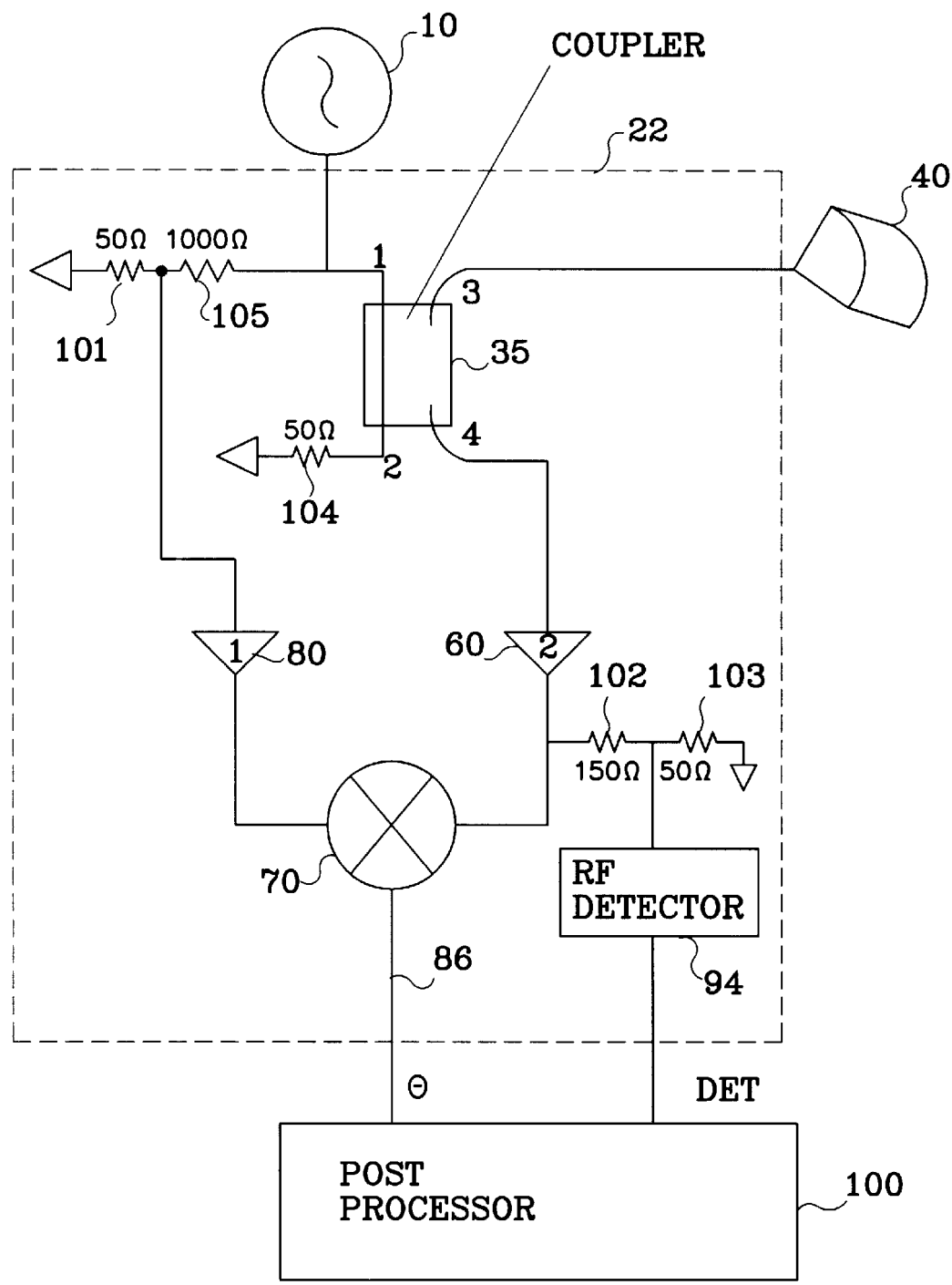
Figure 2C:
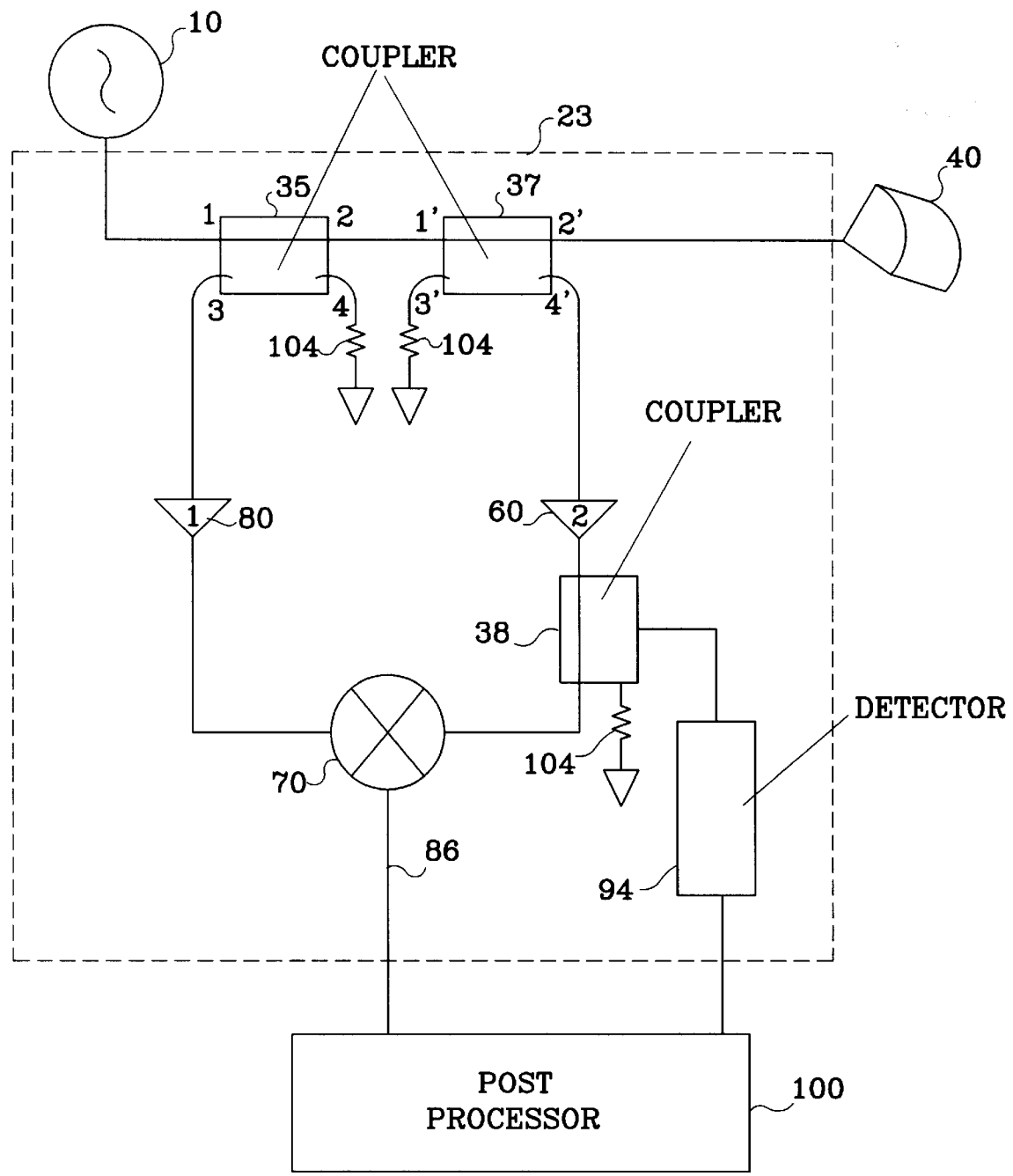

FIGS. 2b and 2c show variants 22 and 23, respectively, of sensor 21 of FIG. 1a. Sensor 22 has a coupler 35 port that has a termination resistor 104. A typical value for resistor 104 is 50 ohms. The input signal to conditioner 80 goes through an impedance network of resistors 105 and 101. Typical values for resistors 105 and 101 may be 1000 and 50 ohms, respectively. Detector 94 is connected to the output of conditioner 60 via an impedance pad or network having resistors 102 and 103. Typical values for resistors 102 and 103 are 150 and 50 ohms, respectively.

Sensor 23 of FIG. 2c has a dual coupler configuration with couplers 35 and 37 interconnected through a port of each coupler. Another port of each coupler is terminated with a resistor 104 which may be typically 50 ohms. Detector 94 is connected to the output of conditioner 60 via coupler 38. One port of coupler 38 is terminated with resistor 104. That resistor may be typically 50 ohms. Resistors 101, 102, 103, 104 and 105 may have other values. Sensors 20, 21, 22 and 23 may be implemented with design variations.

It should be emphasized that optimization for a specific environment may significantly improve device performance. It is possible to implement all of the circuitry for sensor 20, not including antenna 40, of FIG. 1a on one chip, for example, where small size is critical and short range is tolerable. A prototype of the present invention exhibited the following features. Both metal and non-metal targets were detected at distances up to and beyond four inches. Also, metal targets were accurately and unambiguously ranged at distances from zero to 3 inches. It had high resolution ($\leq$0.050 inches), large dynamic range ($\geq$20 dB), and a selectable maximum range or range resolution. No known device has ever achieved this combination of features.

In the case of RF proximity sensors, the size of components—particularly passive ones—is dependent on the operating frequency. Thus, the components' size can be reduced, which has the effect of reducing unambiguous sensor range, reducing component cost and increasing sensor precision.

Figure 3A:
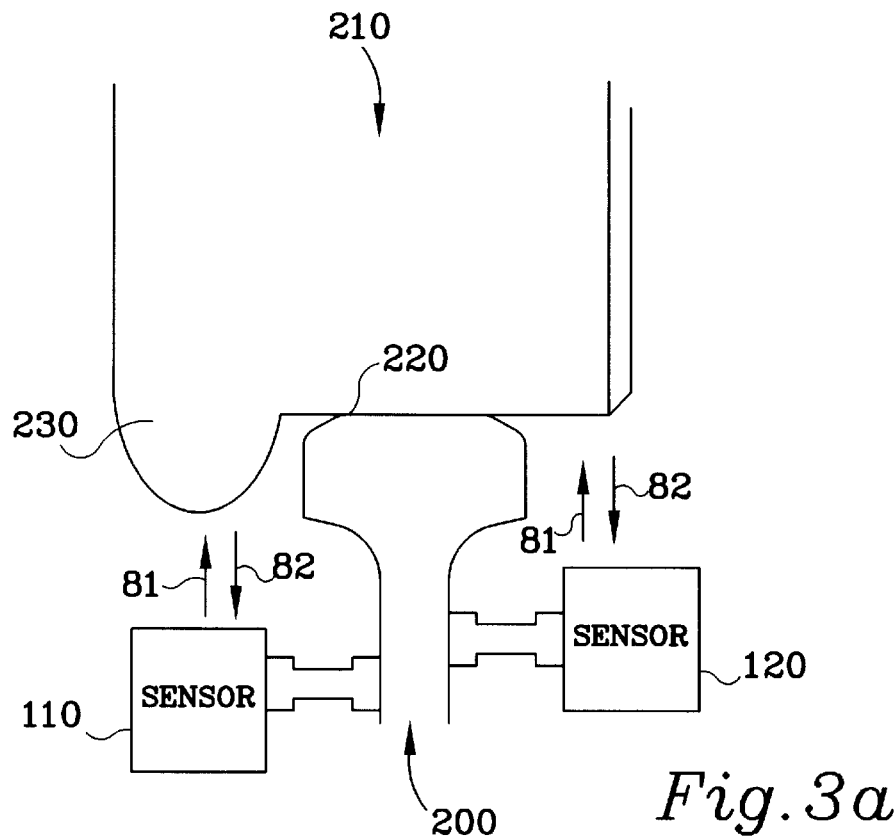
FIGS. 3a and 3b illustrate a cross section of a rail and rail wheel, illustrating how the invention may be used to detect wheel presence and wear.
Figure 3B:
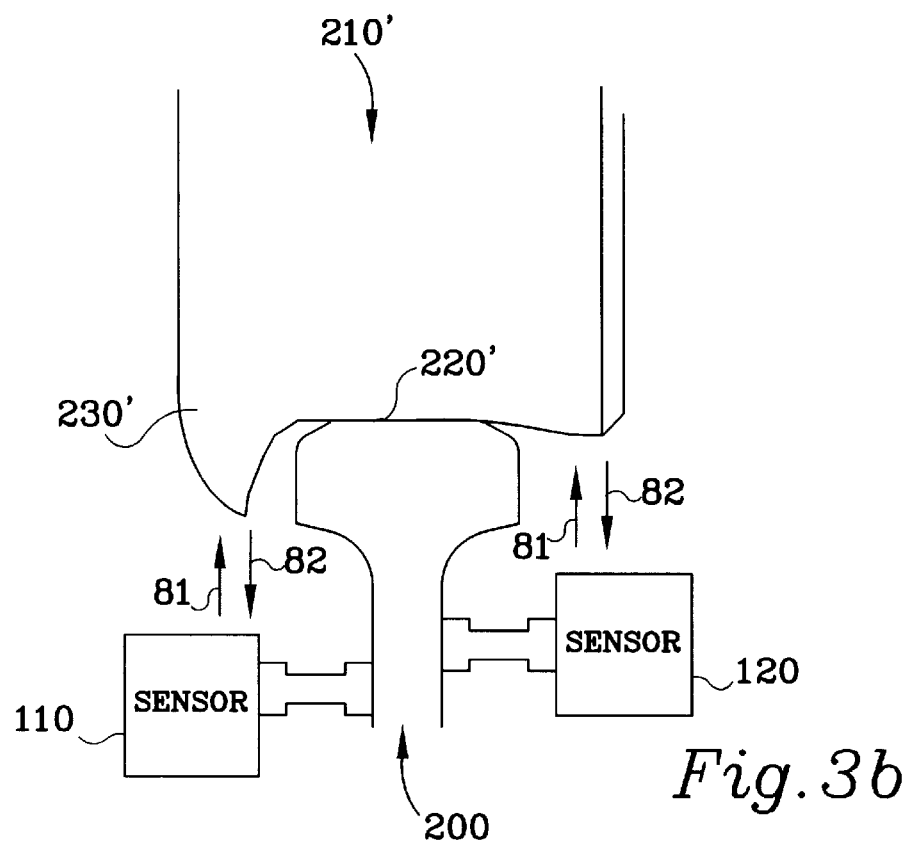

FIGS. 3a through 9 show various features of rail wheel sensing and how various embodiments and applications of the present invention can be used to detect rail wheel presence, train speed, train direction, tread wear and other significant spatial characteristics. FIG. 3a shows a cross section of a normal rail wheel 210 sitting on a train track 200. Wheel tread 220 has a relatively large diameter near wheel flange 230. Proximity sensors 110 and 120, like that of sensor 20 or 21, are mounted on the inner and outer side of rail 200, respectively- FIG. 3b shows a cross section of a worn rail wheel 210'. Wheel tread 220' has a relatively small diameter near wheel flange 230' compared to tread 220. Flange 230' has worn somewhat narrower than flange 230 of normal wheel 210. Note that worn wheel 210' in FIG. 3b passes closer to the outer proximity sensor 120 than normal wheel 210, which shows a measurable spatial indication of wheel wear.

Figure 4A:
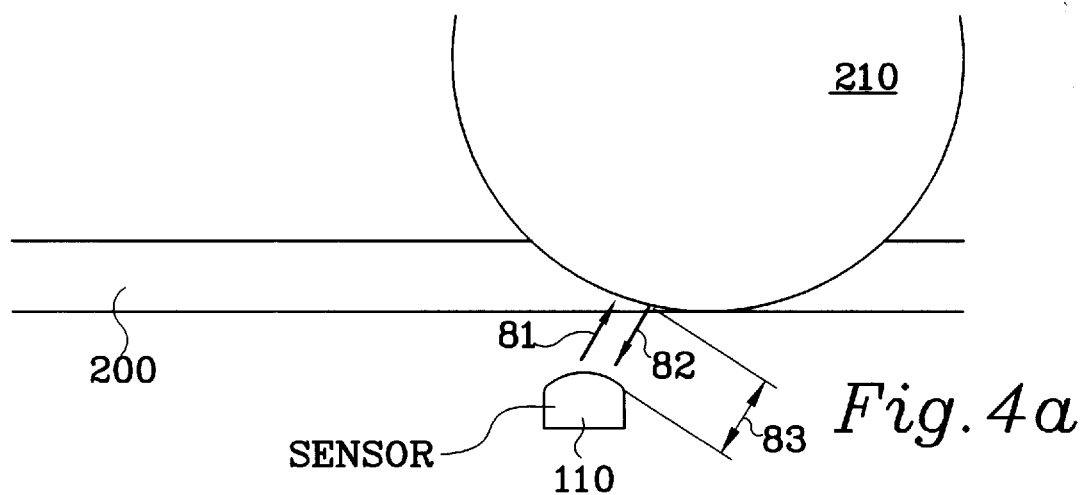
FIGS. 4a, 4b, and 4c show a rail wheel approaching, reaching and receding from a vertically-oriented sensor, respectively.
Figure 4B:
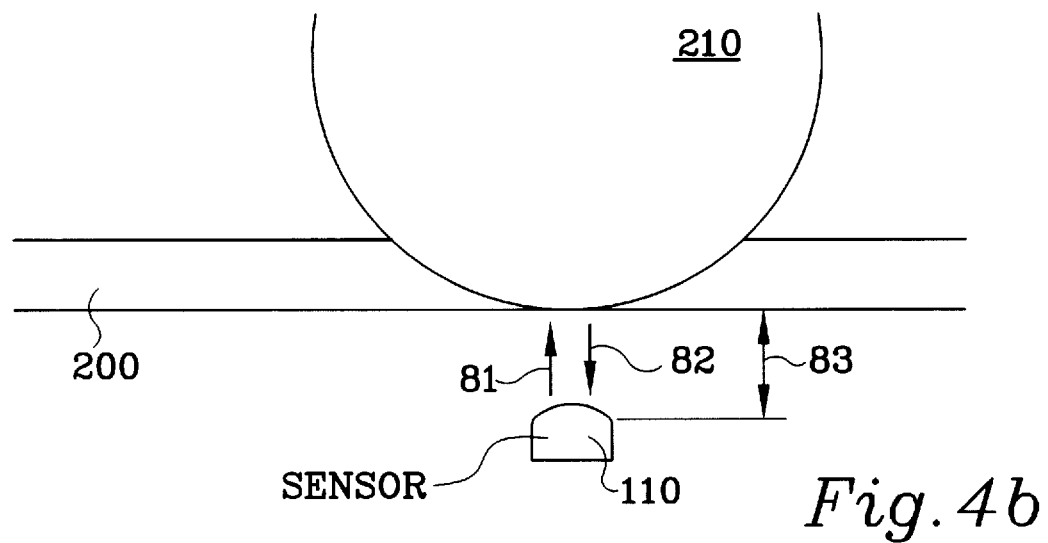
Figure 4C:
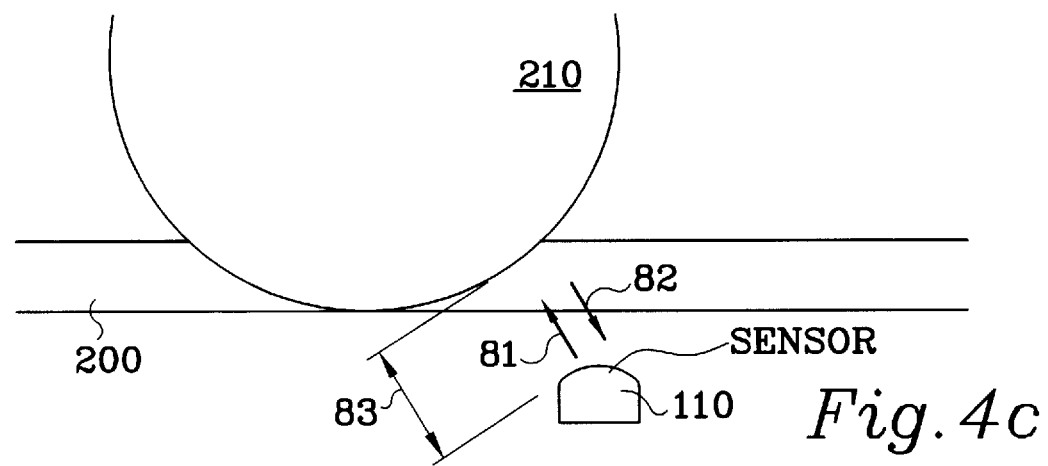

FIGS. 4a, 4b and 4c show a rail wheel approaching, reaching, and receding from a sensor 110, respectively. A system output indicative of rail wheel proximity or distance 83 or R decreases in FIG. 4a, is minimized in FIG. 4b, and increases in FIG. 4c. Because of the high bandwidth of the components in sensor 110, sensor 110 uses the phase offset as a very fast time-of-flight or -travel indicator (disregarding Doppler effects).

Figure 5:
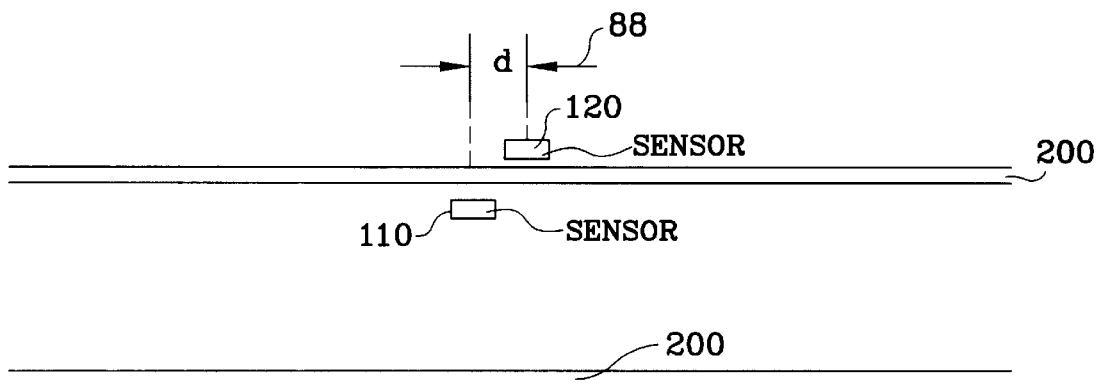
FIG. 5 shows a pair of offset sensors used to determine train or wheel speed and direction.

FIG. 5 shows the sensor plan layout for two sensors 110 and 120 at a distance 88 from each other in the direction of the motion of a wheel of a train to be detected. By the use of different post processor circuits 100, these sensors 110 and 120 together detect train presence, speed and direction, and wheel wear. Because both sensors use voltage signals indicative of distance like those provided by phase comparator 70, of FIGS. 1 and 2, they can be used in parallel. Suppose, for this illustration, that four wheels of a westbound train each encounter outer sensor 120, travel a predetermined offset distance 88 'd', then encounter inner sensor 110. The high bandwidth of sensors 110 and 120 facilitates the determination of high train speeds from the offset. A prototype of these sensors has provided sufficient pulse integrity to measure train speeds up to 320 kilometers per hour accurately.

Figure 6:
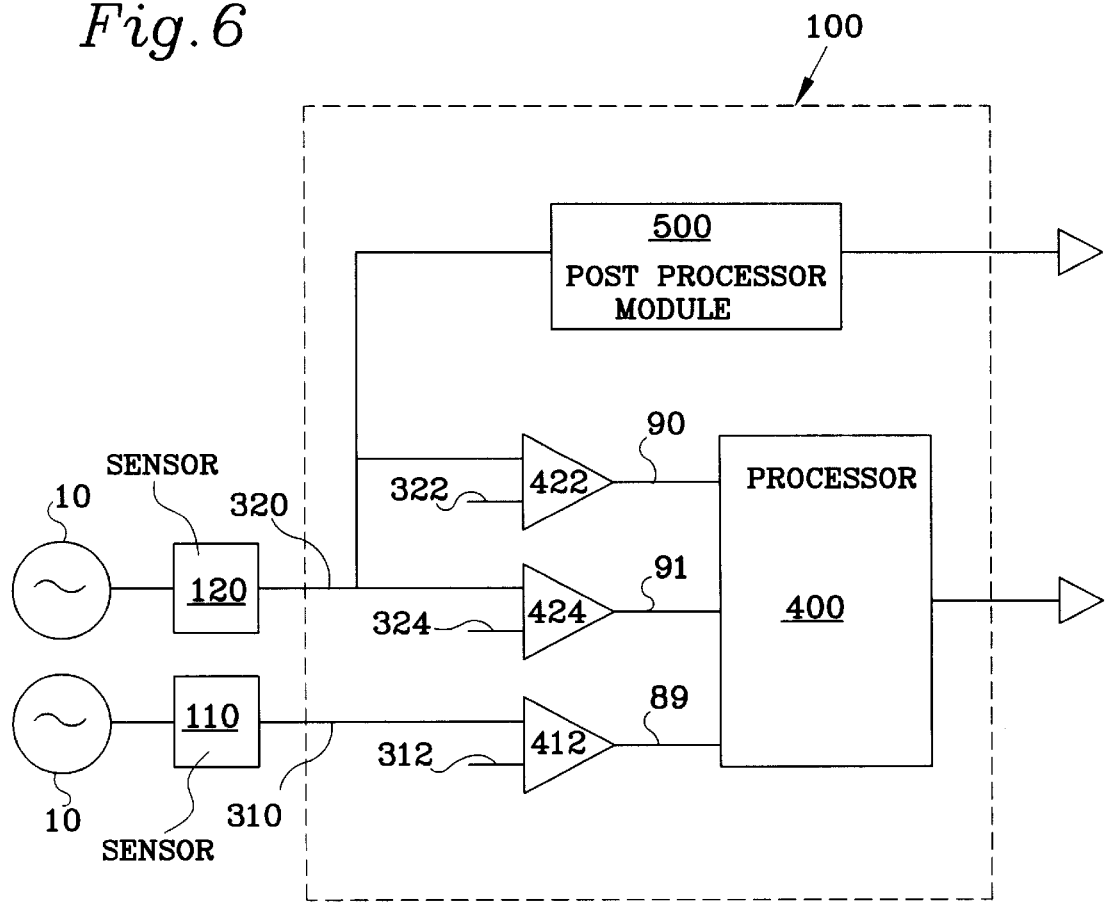
FIG. 6 is an electrical schematic of the configuration of FIG. 5 together with post-processing to allow detection of wheel wear and sensor output display and recording.
Figure 7A:
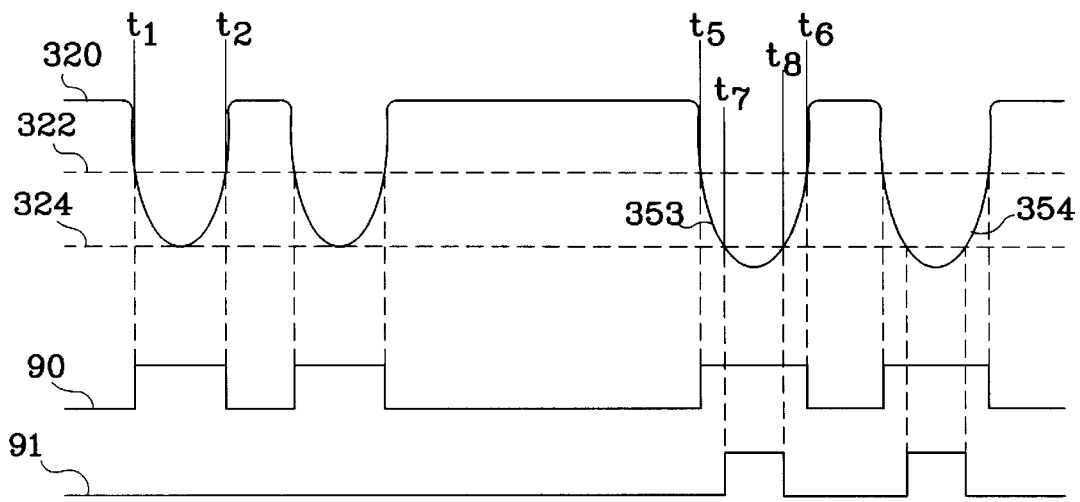
FIG. 7 is a corresponding timing diagram of distance-related signals for a period in which four rail wheels pass the offset sensors of FIG. 5.
Figure 7B:
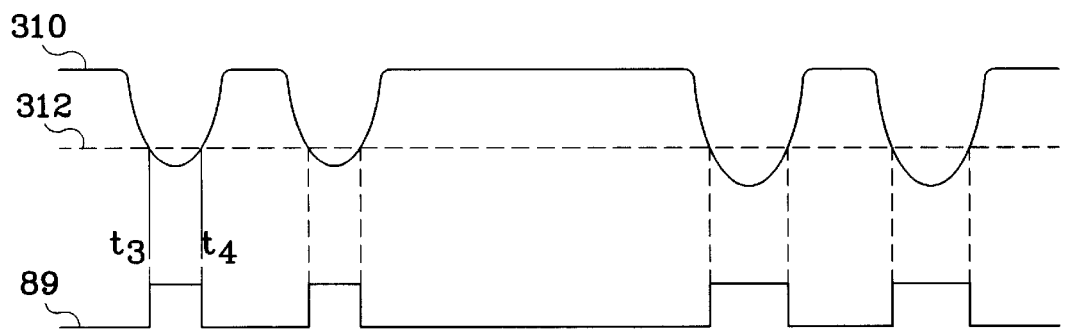

FIG. 6 illustrates a post-processing scheme that may be used with the sensor configuration of FIG. 5. FIG. 7 shows the resulting timing diagram. Inner sensor 110 supplies a sensor output signal 310 to first threshold comparator 412, which compares it with a set first threshold signal 312, reporting transitions to a clocked processor 400. Comparators 422, 424 likewise compare outer sensor output signal 320 with threshold signals 322 and 324, respectively, and report transitions via signals 90 and 91 to processor 400. For best results, all of three threshold comparators 412, 422, 424 should be matched. As FIG. 7 shows, first comparator 412 provides a pulse on signal 89 from $t_3$ to $t_4$, because that is when signal 310 exceeds threshold signal 312 in a negative sense. Second comparator 422 provides a pulse on signal 90 from $t_1$ to $t_2$, because that is when signal 320 exceeds the threshold of signal 322 in a negative manner. Processor 400 records the timing of these pulse transitions and computes a westbound velocity as $2d/(t_1+t_2-t_3-t_4)$. Note that this computation is negative for eastbound trains.

Third threshold comparator 424 similarly provides a pulse on signal 91 to processor 400 when a worn wheel passes the outer sensor 120. A worn wheel will generally pass closer to an outer sensor 120 than a normal wheel, as explained above. The latter pair of signal peaks 353 and 354 of signal 320 exceed threshold signal 324 when wheels pass especially close to the outer sensor 120 as indicated by pulses of signal 91. A proper selection of threshold signal 324 and pulse length limits can thus allow automatic detection of worn rail wheels. To avoid sensor output signal 320 noise spikes appearing as signals 353 and 354 which may be construed as worn wheels, processor 400 is programmed to ignore pulses which are not sustained for at least 20 microseconds.

Post-processor module 500 simply illustrates that sampling, digitizing, displaying, and/or recording can be implemented in parallel with the above post-processing. In one embodiment, all of the elements of the post-processor 100 are designed and/or calibrated with empirical observations about the behavior of sensors according to the implemented sensor design in environments representative of the desired sensing system's actual applications. As shown above, a post-processor 100 may include a high bandwidth voltage comparator to amplify the difference between the sensor output and a predetermined threshold. One method for ascertaining such a threshold is by gathering field data from installed prototypes over a period of time. Equipment for recording sensor output data can readily be installed in parallel with other post-processing equipment, facilitating empirical determination of proper thresholds. In many applications, an optimal determination of threshold can enhance a sensor's tolerance for target-induced variations (such as shape, coupling, and surface properties) as well as environmental variations (like vibration, temperature shifts, electromagnetic noise, snow, dust, etc.).

Enhanced tolerance may reduce or eliminate the need for schemes to compensate for these factors. Empirical data will sometimes suggest that a particular factor cannot be mitigated adequately by a mere threshold adjustment. In such cases, additional compensation measures will be required. If empirical data suggests strong temperature sensitivity, temperature-responsive threshold adjustment may be appropriate. If snow or vibration is a problem, mechanical corrective means may be required. In the case of rail wheel detection, vibration-induced errors may be affected by an improved mounting scheme. If internal signal reflection is a problem, the designer should consider whether load matching may be appropriate. If target-induced variations are too great, sensor repositioning may be appropriate. If the above-described techniques do not sufficiently minimize unwanted reflection within the sensor, or if the receiving mechanism is different from the transmission mechanism, it may be helpful to use a transmitter that is physically separate from the receiver. If a particular application requires highly accurate distance determinations, signal modulation, multiple-frequency schemes incorporating more sophisticated post-processing, or a combination of corrective measures may be appropriate. Such measures are often necessary or helpful in implementing an invention. Even where such measures are novel and useful, they will not ordinarily move an implementation of the present invention outside of its scope.

As discussed, digitizing and using a transform algorithm to compute target range is a useful post-processing task that might be performed in parallel with other tasks, especially during prototyping and empirical testing. It should be understood that the novel embodiments and applications above are merely intended as examples of the present invention. Improved embodiments can be realized for particular contexts, especially in situations where some assumptions can be made about spatial relationships. Where wheel radius is known, for example, the mere width of a pulse provides an indication of train speed. If the distance between wheels on a train is known, train speed can be determined with only one sensor simply by measuring the time between the leading edges of adjacent pulses.

Figure 8:
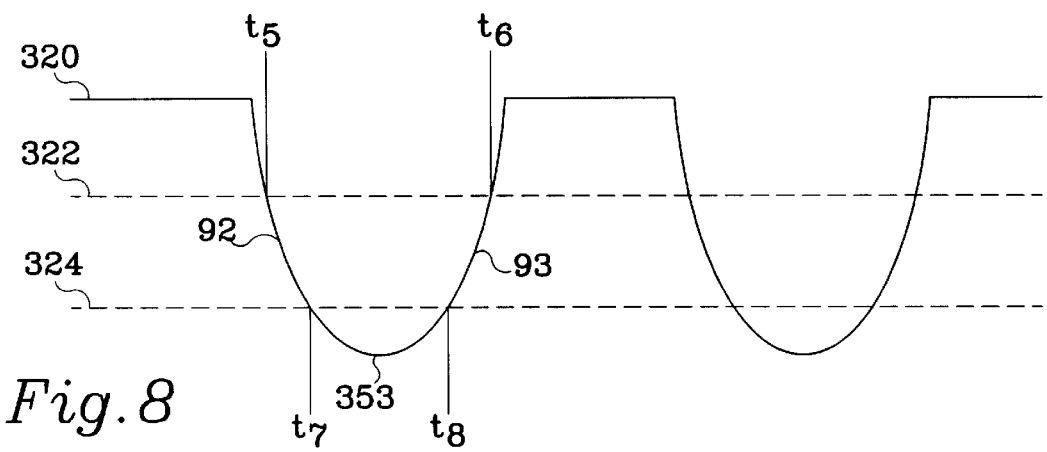
FIG. 8 shows skewed pulses from two wheels of a moving train sensed by a leaning sensor.
Figure 9A:
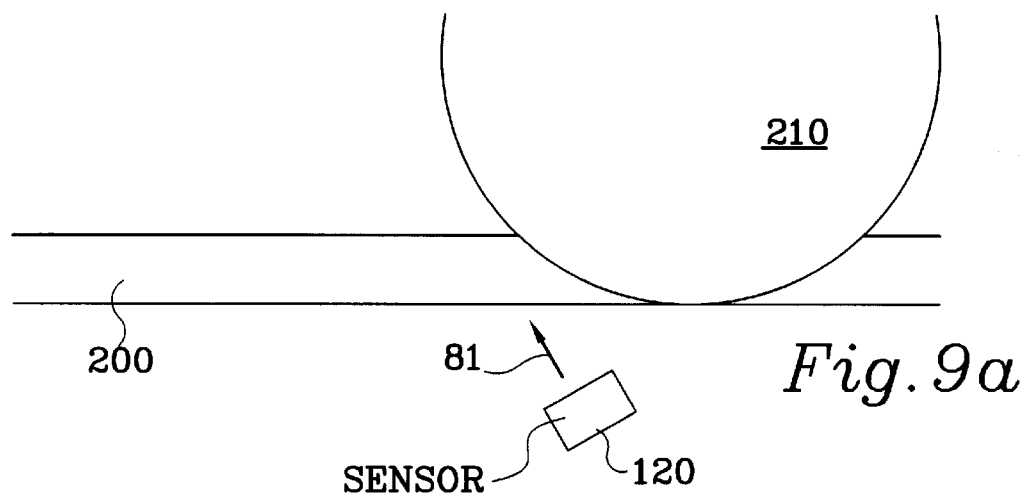
FIGS. 9a, 9b, and 9c illustrate rail wheel approaching, reaching and receding from the sensor associated with FIG. 8, respectively.
Figure 9B:
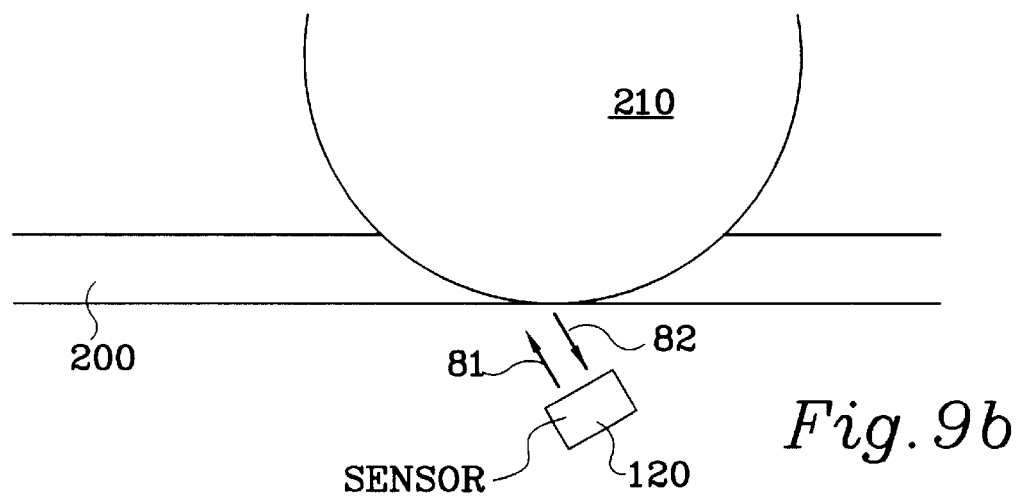
Figure 9C:
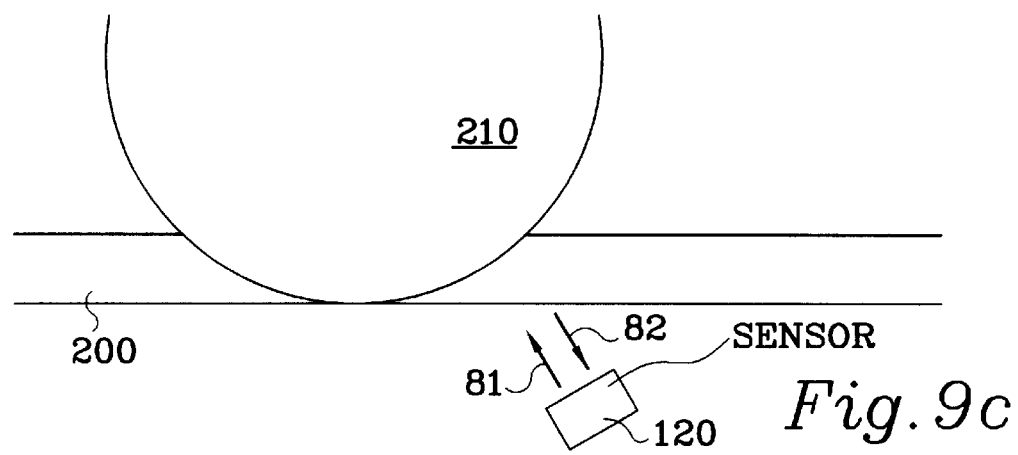

FIG. 8 shows a timing diagram of skewed pulses corresponding to two wheels of a westbound train passing a westward-leaning, high-directivity sensor. This embodiment uses the same configuration shown in FIGS. 5 and 6, but ignores inner sensor 110. Note that the leading edge 92 of waveform 353 of sensor 120 of output signal 320 is relatively steep in contrast to trailing edge 93, indicating that sensor 120 suddenly detects the presence of westbound rail wheel 210. FIG. 9a shows leaning sensor 120 just before $t_5$, just beginning to detect the presence of rail wheel 210. FIG. 9b shows the rail wheel 210 passing directly over the sensor 120, just after $t_7$ but not yet at its closest point. FIG. 9c shows rail wheel 210 near $t_8$, after its closest passage but long before wheel 210 moves out of range, given its westward-leaning orientation. In this embodiment, it can be shown that the westward train speed will have a one-to-one correspondence with $(t_5+t_6-t_7-t_8)$ for a given wheel size. This calculation will be negative for eastbound trains, so this approach can be used to ascertain train direction, even without empirical analysis and inference. If such analysis is incorporated into the processor 400 algorithm, however, the present embodiment would allow the system to ascertain train presence, speed and direction with only one sensor.

By having phase comparator 70 outputs for configurations 20 and 21, as a smooth, monotonic function of target range 83 for a given target 50, and for determining suitable thresholds, timing calculations and other post processing through adaptation of the entity to be detected, the present invention provides a superior approach for proximity sensing and parameter measuring of still or moving objects.

What is claimed is:

1. A proximity sensor having a fast-tracking analog output, comprising:

an oscillator;

a coupler having a first port connected to said oscillator;

an antenna connected to a second port of said coupler;

a first signal conditioner connected to a third port of said coupler;

a second signal conditioner connected to a fourth port of said coupler;

a phase comparator having a first input connected to said first signal conditioner and a second input connected to said second signal conditioner, and having an output; and a signal detector connected to said second signal conditioner; and wherein:

said oscillator outputs an RF signal;

the RF signal goes through said coupler to said antenna;

a portion of the RF signal goes out of the third port of said coupler as a reference RF signal to said first signal conditioner;

the RF signal to said antenna is emitted from said antenna toward a target;

a reflected RF signal is received by said antenna;

the reflected RF signal goes from said antenna to the second port of said coupler, and from the fourth port to said second signal conditioner;

said signal detector provides an output that represents signal strength;

the first and second signal conditioners provide amplitude equalization of the reference RF signal and the reflected RF signal which goes to the first and second inputs of said phase comparator, respectively; and said phase comparator outputs an analog signal indicating a phase difference between the reference RF signal and the reflected RF signal, which represents a distance between the target and said antenna.

2. The proximity sensor of claim 1, wherein the output of said phase comparator has a monotonic dependence on the distance between the target and said antenna.

3. A proximity sensor having a fast-tracking analog output, comprising:

an oscillator;

a coupler having a first port connected to said oscillator;

an antenna connected to a second port of said coupler;

a first signal conditioner connected to a third port of said coupler;

a second signal conditioner connected to a fourth port of said coupler; and a phase comparator having a first input connected to said first signal conditioner and a second input connected to said second signal conditioner, and having an output; and wherein:

said oscillator outputs first and second RF signals at first and second times, respectively;

the first and second RF signals go through said coupler to said antenna;

portions of the first and second RF signals go out of the third port of said coupler as a reference RF signals to said first signal conditioner;

the first and second RF signals going to said antenna are emitted from said antenna toward a target;

reflected first and second RF signals are received by said antenna;

the reflected first and second RF signals go from said antenna to the second port of said coupler, and from the fourth port to said second signal conditioner;

the first and second signal conditioners provide amplitude equalization of the reference RF signals and the reflected first and second RF signals which go to the first and second inputs of said phase comparator, respectively; and said phase comparator outputs first and second analog signals indicating phase differences between the reference RF signals and the reflected first and second RF signals, which represent first and second distances of the target from said antenna at the first and second times, respectively.

4. The proximity sensor of claim 3, wherein a post-processor connected to the output of said phase comparator estimates a component of target velocity from said first and second analog signals.

5. The proximity sensor of claim 3, wherein:
if the first distance is greater than the second distance, then the target is approaching the proximity sensor; and
if the second distance is greater than the first distance, then the target is receding from the proximity sensor.

6. The proximity sensor of claim 5, wherein a difference between the first and second times indicates the speed of the target relative to the proximity sensor.

7. The proximity sensor of claim 6, wherein:
the target is a rail wheel on a rail; and
the proximity sensor is situated at or near the rail.

8. A proximity sensor having a fast-tracking analog output, comprising:
an oscillator;
a coupler having a first port connected to said oscillator;
an antenna connected to a second port of said coupler;
a first signal conditioner connected to a third port of said coupler;
a second signal conditioner connected to a fourth port of said coupler; and
a phase comparator having a first input connected to said first signal conditioner and a second input connected to said second signal conditioner, and having an output; and
wherein:
said oscillator outputs a plurality of RF signals;
the plurality of RF signals goes through said coupler to said antenna;
a portion of each of the plurality of RF signals goes out of the third port of said coupler as a plurality of reference RF signals to said first signal conditioner;
the plurality of RF signals to said antenna is emitted from said antenna toward a target;
a plurality of reflected RF signals is received by said antenna;
the plurality of reflected RF signals goes from said antenna to the second port of said coupler, and from the fourth port of said coupler to said second signal conditioner;
the first and second signal conditioners provide amplitude equalization for each of the plurality of reference RF signals and each of the plurality of reflected RF signals which goes to the first and second inputs of said phase comparator, respectively; and
said phase comparator outputs an analog signal indicating a phase difference between each of the plurality of reflected RF signals and a corresponding reference RF signal of the plurality of reference RF signals, which represents a distance of the target from said antenna.

9. A rail wheel wear indicator comprising:
a sensor, situated proximate to a rail, for detecting a first distance between said sensor and a portion of a rail wheel, and outputting a first signal representative of the first distance;
a source for outputting a second signal representative of a second distance; and
a circuit, connected to said sensor and source, for comparing the first and second signals and outputting a third signal; and
wherein the third signal represents a difference of the first and second distances, and this difference indicates an amount of rail wheel wear; and
wherein said sensor comprises:
an oscillator;
a coupler having a first port connected to said oscillator;
an antenna connected to a second port of said coupler; and
a phase comparator having a first input connected to a third port of said coupler and a second input connected to a fourth port of said coupler, and having an output; and
wherein:
said oscillator outputs an RF signal;
the RF signal goes through said coupler to said antenna;
a portion of the RF signal goes out of the third port of said coupler as a reference RF signal to the first input of said phase comparator;
the RF signal to said antenna is emitted from said antenna toward the portion of the rail wheel;
a reflected RF signal is received by said antenna;
the reflected RF signal goes from said antenna to the second port of said coupler, and from the fourth port to the second input of said phase comparator; and
said phase comparator outputs the first signal indicating a phase difference between the reference RF signal and the reflected RF signal, which is representative of the first distance between the portion of the rail wheel and said antenna.

10. The rail wheel indicator of claim 9, further comprising:
a first signal conditioner connected between the third port of said coupler and the first input of said comparator; and
a second signal conditioner connected between the fourth port of said coupler and the second input of said comparator; and
wherein the first and second signal conditioners provide amplitude equalization of the reference RF signal and the reflected RF signal which go to the first and second inputs of said phase comparator, respectively.

11. A rail wheel detector comprising:
an RF proximity sensor proximate to a rail; and
a processor connected to said RF proximity sensor; and
wherein:
said proximity sensor detects a rail wheel at a first distance at a first time;
said proximity sensor detects the rail wheel at a second distance at a second time;
said processor determines a speed of the rail wheel from the first and second distances and the first and second times;
said RF proximity sensor comprises:
an oscillator;

a coupler having a first port connected to said oscillator;

an antenna connected to a second port of said coupler; and a phase comparator having a first input connected to the third port of said coupler and a second input connected to the fourth port of said coupler, and having an output;

said oscillator outputs first and second RF signals at first and second times, respectively;

the first and second RF signals go through said coupler to said antenna;

portions of the first and second RF signals go out of the third port of said coupler as a reference RF signals to the first input of said comparator;

the first and second RF signals going to said antenna are emitted from said antenna toward the rail wheel;

reflected first and second RF signals are received by said antenna;

the reflected first and second RF signals go from said antenna to the second port of said coupler, and from the fourth port to the second input of said comparator; and said phase comparator outputs first and second analog signals indicating phase differences between the reference RF signals and the reflected first and second RF signals, which represent first and second distances of the target from said antenna at the first and second times, respectively.

12. The rail wheel detector of claim 11, wherein:

a first signal conditioner connected between the third port of said coupler and the first input of said comparator;

a second signal conditioner connected between the fourth port of said coupler and the second input of said comparator;

the first and second signal conditioners provide amplitude equalization of the reference RF signals and the reflected first and second RF signals which go to the first and second inputs of said phase comparator, respectively.

13. A rail wheel speed and direction detector, comprising:

a first RF proximity detector situated near a first side of a rail at a first position of the rail;

a second RF proximity detector situated near a first or second side of the rail at a second position of the rail; and a processor connected to said first and second RF proximity sensors; and wherein:

the first RF proximity sensor detects a rail wheel at the first position at a first time;

the second RF proximity sensor detects the rail wheel at the second position at a second time;

said processor determines a direction and a speed of the rail wheel from the first and second positions and the first and second times;

said first RF proximity sensor comprises:

an oscillator;

a coupler having a first port connected to said oscillator;

an antenna connected to a second port of said coupler; and a phase comparator having a first input connected to the third port of said coupler and a second input connected to the fourth port of said coupler, and having an output to a first input of said processor;

said second RF proximity sensor comprises:

an oscillator;

a coupler having a first port connected to said oscillator;

an antenna connected to a second port of said coupler; and a phase comparator having a first input connected to the third port of said coupler and a second input connected to the fourth port of said coupler, and having an output to a second input of said processor;

of said first proximity sensor:

said oscillator outputs an RF signal;

the RF signal goes through said coupler to said antenna;

a portion of the RF signal goes out of the third port of said coupler as a reference RF signal to the first input of said phase comparator;

the RF signal to said antenna is emitted from said antenna toward the rail wheel at the first position at the first time;

a reflected RF signal is received by said antenna;

the reflected RF signal goes from said antenna to the second port of said coupler, and from the fourth port to the second input of said phase comparator; and said phase comparator outputs an analog signal indicating a phase difference between the reference RF signal and the reflected RF signal, which represents a distance of the rail wheel from said antenna, which indicates the first position of the rail wheel at the first time; and of said second proximity sensor:

said oscillator outputs an RF signal;

the RF signal goes through said coupler to said antenna;

a portion of the RF signal goes out of the third port of said coupler as a reference RF signal to the first input of said phase comparator;

the RF signal to said antenna is emitted from said antenna toward the rail wheel at the second position at the second time;

a reflected RF signal is received by said antenna;

the reflected RF signal goes from said antenna to the second port of said coupler, and from the fourth port to the second input of said phase comparator; and said phase comparator outputs an analog signal indicating a phase difference between the reference RF signal and the reflected RF signal, which represents a distance of the rail wheel from said antenna, which indicates the second position of the rail wheel at the second time.

14. A proximity sensor comprising:

means for generating an RF signal;

means, connected to said means for generating the RF signal, for radiating the RF signal and receiving a reflected RF signal from a target;

means, connected to said means for generating the RF signal and to said means for radiating the RF signal and receiving the reflected RF signal, for determining a phase difference between the radiated and reflected RF signals that indicates a distance between the target and said means for radiating the RF signal and receiving the reflected RF signal; and means, connected to said means for radiating the RF signal and receiving the reflected RF signal and to said means for determining the phase difference between the radiated and reflected RF signals, for converting the phase difference into an indication of a distance between the target and said means for radiating the RF signal and receiving the RF signal.

15. A proximity sensor having a fast tracking analog output, comprising:

a first RF oscillator;

a second RF oscillator;

a signal splitter having an input port connected to an output of said second RF oscillator;

a modulator having a first input connected to an output of said first RF oscillator and a second input connected to a first output of said splitter;

a coupler having a first port connected to an output of said modulator;

an RF antenna connected to a second port of said coupler;

a demodulator having an input connected to a third port of said coupler;

a first signal conditioner having an input connected to an output of said demodulator;

a second signal conditioner having an input connected to a second output of said splitter;

a phase comparator having a first input connected to an output of said first signal conditioner and a second input connected to an output of said second signal conditioner, and having an output indicative of a phase difference between RF signals from the outputs of said first and second signal conditioners, respectively; and a detector having an input connected to the output of said phase comparator for converting the phase difference into a distance.

16. A rail wheel wear indicator comprising:

a first RF proximity sensor, situated near a first side of a rail, for detecting a first distance between said first RF proximity sensor and a first portion of a rail wheel, and outputting a first signal representing the first distance;

a second RF proximity sensor, situated near a second side of the rail, for detecting a second distance between said second RF proximity sensor and a second portion of the rail wheel, and outputting a second signal representing the second distance;

a first source for outputting a third signal representing a third distance;

a second source for outputting a fourth signal, representing a fourth distance;

a first circuit for comparing the first and third signals and outputting a fifth signal; and a second circuit for comparing the second and fourth signals and outputting a sixth signal; and wherein:

the fifth signal represents a difference of the first and third distances, and this difference indicates an amount of rail wheel wear detected from the first side of the rail; and the sixth signal represents a difference of the second and fourth distances, and this difference indicates an amount of rail wheel wear detected from the second side of the rail.

17. The rail wheel wear indicator of claim 16, wherein: said first RF proximity sensor comprises:

an oscillator;

a coupler having a first port connected to said oscillator;

an antenna connected to a second port of said coupler; and a phase comparator having a first input connected to a third port of said coupler and a second input connected to a fourth port of said coupler, and having an output for outputting a first signal representing the first distance; and said second RF proximity sensor comprises:

an oscillator;

a coupler having a first port connected to said oscillator;

an antenna connected to a second port of said coupler; and a phase comparator having a first input connected to a third port of said coupler and a second input connected to a fourth port of said coupler, and having an output for outputting a second signal representing the second distance.

18. The rail wheel wear indicator of claim 17, wherein: of said first RF proximity sensor:

said oscillator outputs an RF signal;

the RF signal goes through said coupler to said antenna;

a portion of the RF signal goes out of the third port of said coupler as a reference RF signal to the first input of the phase comparator;

the RF signal to said antenna is emitted from said antenna toward the first portion of the rail wheel;

a reflected RF signal is received by said antenna;

the reflected RF signal goes from said antenna to the second port of said coupler, and from the fourth port of said coupler to the second input of said phase comparator; and said phase comparator outputs a first signal indicating a phase difference between the reference RF signal and the reflected RF signal, which represents the first distance between said antenna and the first portion of the rail wheel; and of said second RF proximity sensor:

said oscillator outputs an RF signal;

the RF signal goes through said coupler to said antenna;

a portion of the RF signal goes out of the third port of said coupler as a reference RF signal to the first input of the phase comparator;

the RF signal to said antenna is emitted from said antenna toward the second portion of the rail wheel;

a reflected RF signal is received by said antenna;

the reflected RF signal goes from said antenna to the second port of said coupler, and from the fourth port of said coupler to the second input of said phase comparator; and said phase comparator outputs a second signal indicating a phase difference between the reference RF signal and the reflected RF signal, which represents the second distance between said antenna and the second portion of the rail wheel.

19. The rail wheel wear indicator of claim 18 wherein: said first RF proximity further comprises:

a first signal conditioner connected between the third port of said coupler and the first input of said comparator;

a second signal conditioner connected between the fourth port of said coupler and the second input of said comparator; and wherein the first and second signal conditioners provide amplitude equalization of the reference RF signal and the reflected RF signal which go to the first and second inputs of said phase comparator, respectively; and said second RF proximity further comprises:

a first signal conditioner connected between the third port of said coupler and the first input of said comparator;

a second signal conditioner connected between the fourth port of said coupler and the second input of said comparator; and wherein the first and second signal conditioners provide amplitude equalization of the reference RF signal and the reflected RF signal which go to the first and second inputs of said phase comparator, respectively.

* * * * *